W. H. SHAFER & A. MAUCK, Sr.
Reels for Harvesters.

No. 153,619.  Patented July 28, 1874.

WITNESSES.
Franck L. Ourand
C. L. Evert.

INVENTOR
Wm H. Shafer
Alfred Mauck Sr.

By

Attorneys.

UNITED STATES PATENT OFFICE.

WILLIAM H. SHAFER AND ALFRED MAUCK, SR., OF PRINCETON, INDIANA.

IMPROVEMENT IN REELS FOR HARVESTERS.

Specification forming part of Letters Patent No. 153,619, dated July 28, 1874; application filed March 10, 1874.

*To all whom it may concern:*

Be it known that we, WILLIAM H. SHAFER and ALFRED MAUCK, Sr., of Princeton, in the county of Gibson and in the State of Indiana, have invented certain new and useful Improvements in Harvester-Reels; and do hereby declare that the following is a full, clear, and exact description thereof, reference being had to the accompanying drawings, and to the letters of reference marked thereon, making a part of this specification.

Our invention relates to that class of harvester-reels in which the reel is made adjustable up and down on the reel-post; and the nature of our invention consists in the construction and arrangement of the devices whereby the reel is held on the reel-post, adjusted up and down on the same, and held at any point desired, as will be hereinafter more fully set forth.

In order to enable others skilled in the art to which our invention appertains to make and use the same, we will now proceed to describe its construction and operation, referring to the annexed drawing, in which—

Figure 1:
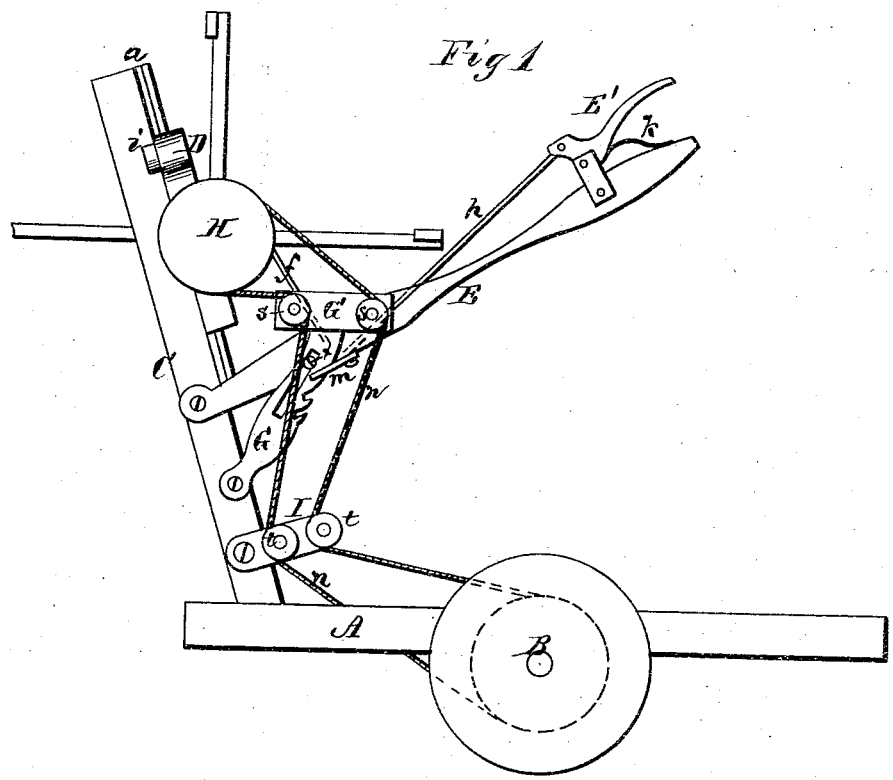
Figure 2:
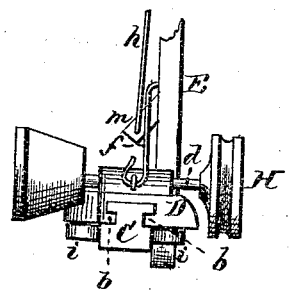

Figure 1 is a side elevation of our machine, and Fig. 2 is a plan view of the reel-post and head of the reel.

A represents a part of the frame of a harvester, and B the driving-shaft or axle. C is the reel-post, of any suitable height, and provided on each side with a longitudinal groove, $a$, to receive ribs or tongues $b\ b$ on a sliding head or carriage, D, in which the reel-shaft $d$ has its bearing. On the rear side of the carriage D are suitable projecting studs, upon which are friction-rollers $i\ i$, which bear against the sides of the reel-post to render the moving up and down of the reel-head or carriage D easy, and prevent it from binding on the post. The reel-head or carriage D is, by a rod, $f$, connected with a lever, E, the inner end of which is pivoted to the side of the reel-post C. On the same side of the post, and below the lever E, is pivoted a ratchet-bar, G, which is slotted longitudinally, and connected to the lever by means of a screw, $x$, passing through the slot in the ratchet-bar. On the upper side of the lever E, near the outer end, is pivoted a thumb-piece, E′, connected by a rod, $h$, to an L-shaped dog, $m$, which is pivoted on the under side of the lever, and takes into the ratchet-bar G to hold the lever, and, consequently, also the reel, at any desired height. The dog $m$ is held in the ratchet-bar G by a spring, $k$, under the thumb-piece E′. $n$ is the rope or belt for revolving the reel. This rope passes around a pulley on the driving-shaft, and around a pulley, H, on the reel-shaft $d$. The rope also passes around two pulleys, $s\ s$, mounted on a cross-bar, G′, attached to or formed on the upper end of the ratchet-bar G, and also around two pulleys, $t\ t$, mounted on a bar, I, which is pivoted at or near the foot of the post C. By this means the rope is always kept sufficiently tight to revolve the reel at whatever height it may be placed.

Having thus fully described our invention, what we claim as new, and desire to secure by Letters Patent, is—

The combination of the reel-post C, carriage D, rod $f$, lever E, slotted ratchet-bar G, screw $x$, and dog $m$, all constructed substantially as and for the purposes herein set forth.

In testimony that we claim the foregoing we have hereunto set our hands this 9th day of February, 1874.

WILLIAM H. SHAFER.
ALFRED MAUCK, SR.

Witnesses:
J. C. KIMBALL,
HIRAM DRAINE.